(12) United States Patent
Lee

(10) Patent No.: US 11,953,747 B2
(45) Date of Patent: Apr. 9, 2024

(54) PRE-TERMINATION MODULE BOX AND OPTICAL FIBER DISTRIBUTION BOX USING SAME

(71) Applicant: Shenzhen JunJin Technology Co., Ltd., Shenzhen (CN)

(72) Inventor: Terry Lee, Shenzhen (CN)

(73) Assignee: SHENZHEN JUNJIN TECHNOLOGY CO., LTD., Shenzhen (CN)

( * ) Notice: Subject to any disclaimer, the term of this patent is extended or adjusted under 35 U.S.C. 154(b) by 63 days.

(21) Appl. No.: 17/891,156

(22) Filed: Aug. 19, 2022

(65) Prior Publication Data

US 2024/0061200 A1   Feb. 22, 2024

(51) Int. Cl.
*G02B 6/44*   (2006.01)

(52) U.S. Cl.
CPC ................... *G02B 6/4441* (2013.01)

(58) Field of Classification Search
CPC .. G02B 6/3897; G02B 6/4441; G02B 6/4452; G02B 6/44528; G02B 6/4455
See application file for complete search history.

(56) References Cited

U.S. PATENT DOCUMENTS

| | | | |
|---|---|---|---|
| 10,795,105 B1 * | 10/2020 | Li ....................... | G02B 6/4454 |
| 11,686,912 B1 * | 6/2023 | Woodward ........... | G02B 6/4455 |
| | | | 385/135 |
| 11,740,421 B2 * | 8/2023 | Van Baelen ....... | G02B 6/44526 |
| | | | 385/135 |

FOREIGN PATENT DOCUMENTS

CN   218122312 U  * 12/2022

* cited by examiner

*Primary Examiner* — Omar R Rojas

(57) ABSTRACT

A pre-termination module box and an optical fiber distribution box using same are provided, twelve groups of MDC adapters configured at a front end of a box body and arranged in a horizontal, single row. Each group of the twelve groups of MDC adapters adopts at least one two-core MDC connector, and a plurality of groups of MPO adapters configured at a rear end of the box body and arranged in a horizontal single row to connect with the twelve groups of MDC adapters. A receiving room is formed in the box body for receiving patch cords that are connected between the MDC and MPO adapters, a locking member arranged at the rear end and configured to lock the pre-termination module box in the optical fiber distribution box, which has high wiring capacity and is conducive to reducing a floor area of a central machine room and saving costs.

3 Claims, 7 Drawing Sheets

PRE-TERMINATION MODULE BOX AND OPTICAL FIBER DISTRIBUTION BOX USING SAME

BACKGROUND

1. Technical Field

The present disclosure generally relates to the field of optical fiber communication technologies, and especially relates to a pre-termination module box and an optical fiber distribution box using same.

2. Description of Related Art

A press modular ultra-high density MPO (Multi-fiber Push On) fiber distribution cabinet is mainly used for optical network wiring and data center wiring.

A common 144-core MPO optical fiber distribution box is mainly realized by twelve ultra-thin twelve-core pre-termination MPO-LC (Lucent Connector) plastic optical fiber module boxes. The above module boxes are arranged in three layers, and a 144-core optical fiber wiring is installed and managed through a three-layer drawer structure of the above module boxes. Such MPO optical fiber distribution box needs to be customized, which is costly and incompatible with a size of an international standard MPO optical fiber distribution box; the above module box can only be used for a twelve-core MPO optical fiber network wiring so that a 24-core MPO connector can't be installed and docked; the optical fiber distribution box is managed by layers, when maintaining a single module box, it is still necessary to pull out the other three module boxes at the same time, which is easy to cause interference to signal transmission therebetween.

A conventional 1U distribution cabinet that is compatible with 12-core and 24-core MPO optical fiber systems at the same time can't match 144-core optical fiber systems. The 1U (a unit of external sizes of a server) distribution cabinet is made of sheet metal, four MPO module boxes are installed in a box of the 1U distribution cabinet through plastic buckles. Because the plastic buckles occupy spaces, a width of the 1U distribution cabinet can only be assembled with four 96-core module boxes.

A conventional 144-core MPO distribution cabinet mainly uses eighteen 8-core pre-termination MPO-LC plastic optical fiber module boxes. The eighteen module boxes are installed and managed through a three-layer drawer structure. The pre-termination MPO-LC plastic optical fiber module box can only be used for a 8-core MPO optical fiber network wiring, which can't be connected to 12-core and 24-core MPO connection adapters; and the optical fiber distribution box is managed by layers, which is easy to interfere with normal signal transmission during maintenance.

SUMMARY

The technical problems to be solved: in view of the shortcomings of the related art, the present disclosure provides an improved pre-termination module box and an optical fiber distribution box using same.

The technical solution adopted for solving technical problems of the present disclosure is:

an optical fiber distribution box according to an embodiment of the present disclosure includes a box and a pre-termination module box that is installed in the box, the box including a receiving groove with an opening at an end thereof, the pre-termination module box disassembled independently through the receiving groove with the opening thereof; and wherein the pre-termination module box includes: a box body; twelve groups of MDC adapters configured at a front end of the box body and arranged in a horizontal single row, each group of the twelve groups of MDC adapters adopting at least one two-core MDC connector, and a plurality of groups of MPO adapters configured at a rear end of the box body and arranged in a horizontal single row to connect with the twelve groups of MDC adapters; and a receiving room formed in the box body for receiving patch cords that are connected between the twelve groups of MDC adapters and the plurality of groups of MPO adapters, a locking member arranged at the rear end of the box body and configured to lock pre-termination module box in an optical fiber distribution box; and wherein the locking member arranged at the rear end of the box body is matched with a rear end of the receiving groove through an elastic press-type lock, the box body sliding relative to the receiving groove, and when the box body slides into the receiving groove through the opening of the receiving groove, the elastic press-type lock is triggered to lock the box body to the box; and wherein a first guiding rod and a second guiding rod are respectively arranged at two sides of the box body, the first guiding rod is cylindrical, and the second guiding rod is square, a first guiding groove and a second guiding groove respectively arranged at two sides of the receiving groove to in conformity with the corresponding first and second guiding rods; a front end of the first guiding rod extending outside, and a pressing plate arranged at the front end of the first guiding rod for releasing the box body.

Wherein a limiting structure is arranged between the box body of the pre-termination module box and the receiving groove, and operable to be released.

Wherein there are two receiving grooves arranged in the box side by side, and three pre-termination module boxes stacked up and down in each of the two receiving grooves.

The present disclosure provides the advantages as below: the pre-termination module box of the present disclosure provides twelve groups of MDC adapters, each group of the twelve groups of MDC adapters adopting at least one two-core MDC connector, in this way, there are at least 24 cores in the pre-termination module box, so that patch cords can be configured according to actual usage requirements, such as 8-core, 12-core or 24-core patch cords can be selected for connection to be applicable to different optical fiber systems. The pre-termination module box is installed to the optical fiber distribution box by locking the rear end of the pre-termination module box with the box of the optical fiber distribution box, which can effectively avoid a width of the pre-termination module box being too large, so that a 1U optical fiber distribution box can be equipped with six pre-termination module boxes; moreover, each pre-termination module box can independently disassembly and assembly, which will not interfere with other pre-termination module boxes during installation or disassembly.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. The same

Figure 1:
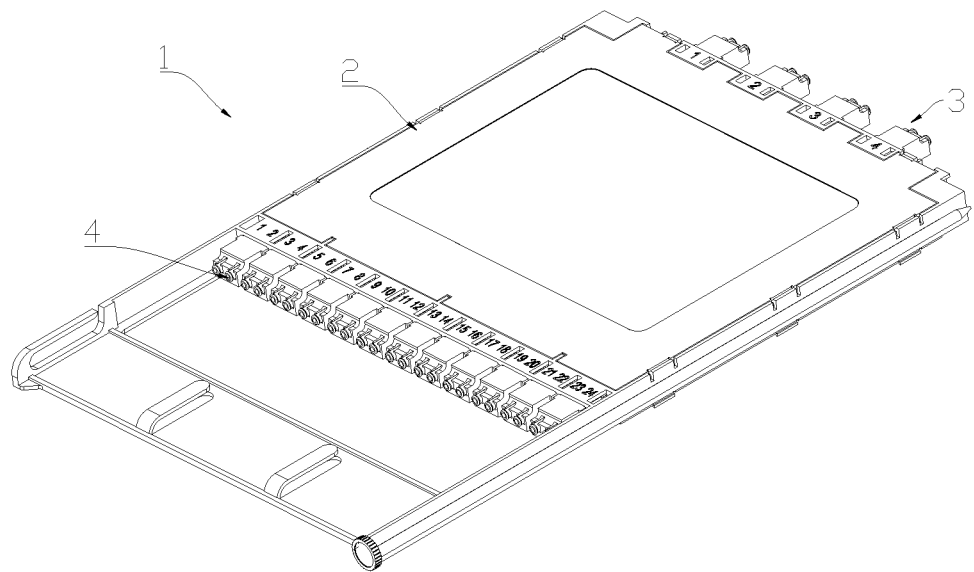
FIG. 1 is a schematic view of a pre-termination module box in accordance with an embodiment of the present disclosure.

The element labels according to the embodiment of the present disclosure shown as below:

1 pre-termination module box, 100 locking member, 101 elastic press-type lock, 2 box body, 200 limiting structure, 3 MPO adapter, 4 MDC connector, 5 patch cord, 6 receiving room, 7 optical fiber distribution box, 8 box, 9 first guiding rod, 901 pressing plate, 10 receiving groove, 11 first guiding groove, 12 second guiding groove, 13 second guiding rod, 14 block, 15 wire managing bracket, 16 locking tab, 17 buckling seat, 18 buckling claw, 19 sliding block.

DETAILED DESCRIPTION

In order to more clearly understand the technical solution hereinafter in embodiments of the present disclosure, reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples.

According to the described exemplary embodiment of the present disclosure, all other embodiments obtained by one of ordinary skill in the related art without the need for a creative labor are within the protection scope of the present disclosure. Unless defined otherwise, the technical terms or scientific terms used for the present disclosure shall be a general meaning commonly understood by those having ordinary skill in the related art to which the present disclosure is applied.

In the description of the present disclosure, it needs to be understood that the terms mentioned below: the terms such as "first" and "second" shown in the specification are only used to describe, but not indicated that the elements of the present disclosure is important or represented the amount of the elements. That is, the features limited by the terms of "first" and "second" may explicitly or implicitly include one or more features. Similar, in the description of the present disclosure, the meaning of the term "one", "a" and "the" don't indicate a quantitative limit, but rather not less than two unless it is specifically illustrated. Furthermore, the terms such as "include", "including", "comprising" and "comprise" and the like means that elements or items in front of such term is intended to cover the elements or objects appeared the list behind the term and its equivalent, without excluding other elements or items. In the description of the present disclosure, except where specifically otherwise illustrated or limited, the terms "install", "connect", "link" and "fix" used herein should be understood in a broad perceive. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure. In addition, the terms such as "upper", "below", "left", and "right", etc, are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

Figure 2:
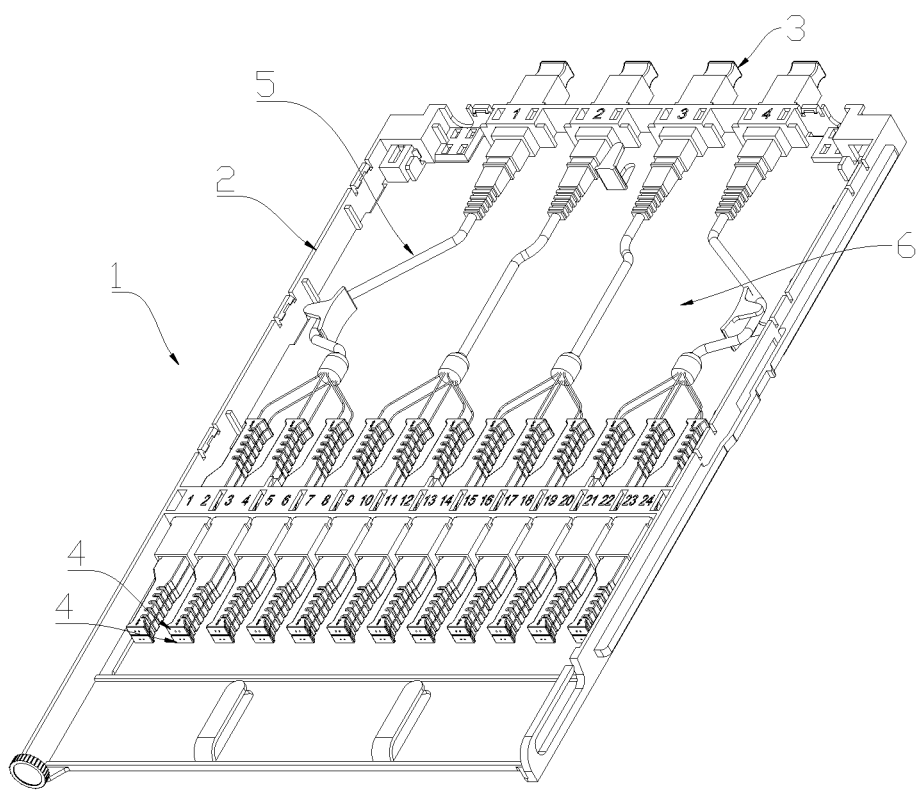
FIG. 2 is a first interior schematic view of the pre-termination module box of FIG. 1.
Figure 3:
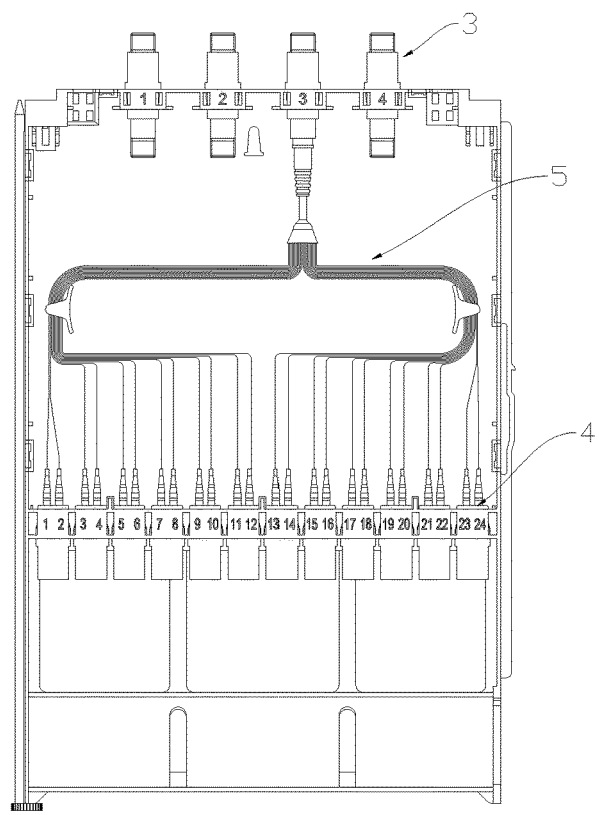
FIG. 3 is a second interior schematic view of the pre-termination module box of FIG. 1.
Figure 4:
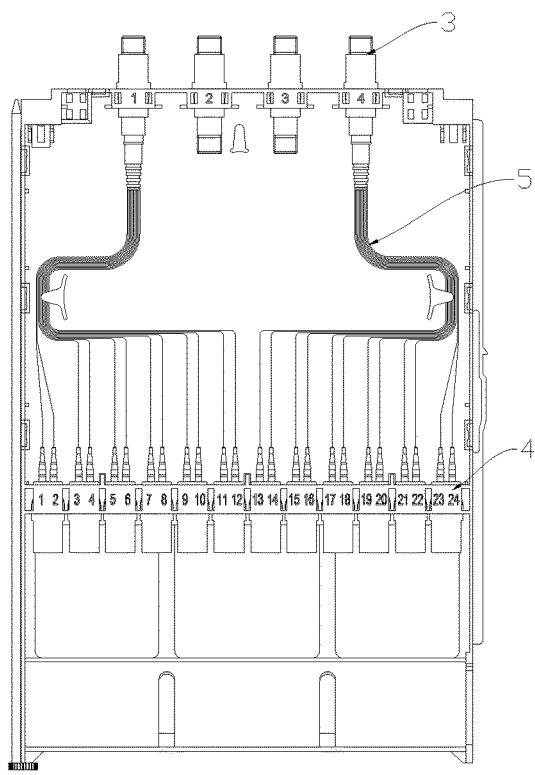
FIG. 4 is a third interior schematic view of the pre-termination module box of FIG. 1.
Figure 5:
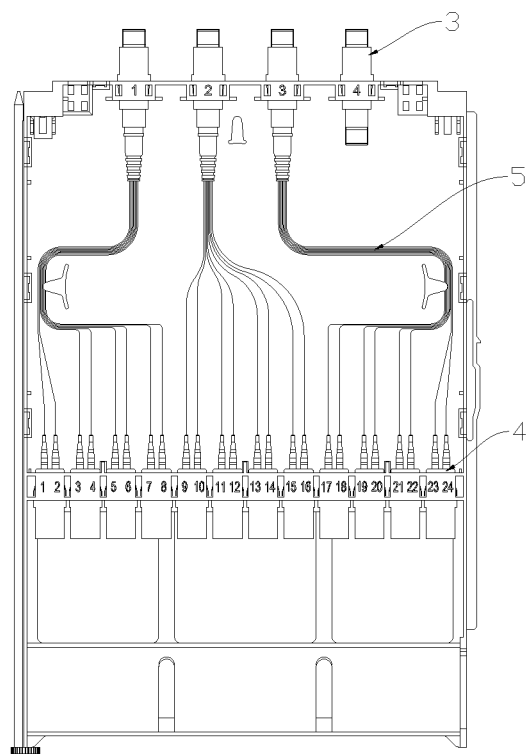
FIG. 5 is a fourth interior schematic view of the pre-termination module box of FIG. 1.
Figure 6:
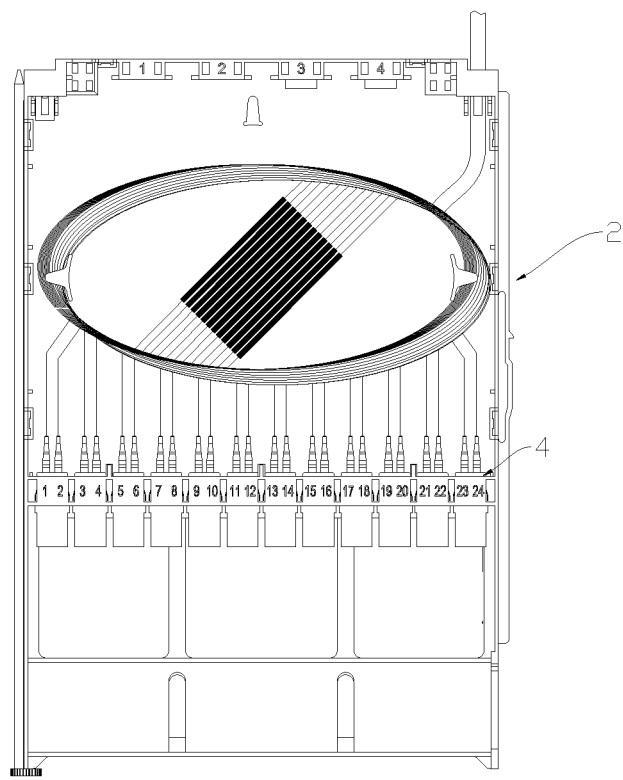
FIG. 6 is a fifth interior schematic view of the pre-termination module box of FIG. 1.

Referring to FIGS. 1-6, a pre-termination module box according to an embodiment of the present disclosure includes a box body 2, twelve groups of MDC adapters configured at a front end of the box body 2 and arranged in a horizontal single row, each group of the twelve groups of MDC adapters adopting at least one two-core MDC connector 4. A plurality of groups of MPO adapters is configured at a rear end of the box body 2 and arranged in a horizontal single row to connect with the twelve groups of MDC adapters; and a receiving room 6 formed in the box body 2 for receiving patch cords 5 that are connected between the twelve groups of MDC adapters and the plurality of groups of MPO adapters. A locking member 100 is arranged at the rear end of the box body 2 to lock the box body 2 in the optical fiber distribution box.

In the present disclosure, the two-core MDC connectors 4 are used to form an adapter, and there are twelve groups of MDC adapters in total. Each group of the twelve groups of MDC adapters includes at least one MDC connector 4, that is, the pre-termination module box is at least 24 cores. It can select patch cords according to different optical fiber system requirements, which can match the patch cords with 8 cores, 12 cores and 24 cores, in this way, the optical fiber distribution box 7 that installs with the pre-termination module box of the embodiment can be compatible with functions of various MPO optical fiber distribution boas in the market.

Specifically, in an embodiment of the present disclosure, each group of adapters adopts only one MDC connector 4 to form a 24-core pre-termination module box, and then a layout of patch cords is performed according to an actual usage scenario. For example, one MPO-LC 24-core patch cord 5 (seen in FIG. 3) is installed to realize an optical fiber wiring function of a conventional 24-core MPO-LC module box in the market. Two MPO-LC 12-core patch cords 5 (seen in FIG. 4) are installed to realize an optical fiber wiring function of a conventional 12-core MPO-LC module box in the market. Three MPO-LC 8-core patch cords 5 (seen in FIG. 5) are installed to realize an optical fiber wiring function of a conventional 8-core MPO-LC module box widely used in the market. Furthermore, a plurality of wire managing brackets 15 can be arranged in the box body to facilitate orderly and orderly fix the patch cord 5.

The pre-termination module box 1 is locked with the optical fiber distribution box 7 through the rear end of the box body of the pre-termination module box 1. Compared with a setting of installing plastic fixing buckles on sides of a conventional distribution cabinet, a scheme of locking the rear end of the present disclosure can prevent the pre-termination module box 1 from occupying too much width during installing the pre-termination module box 1, so that six module boxes can be placed in the 1U optical fiber distribution box 7.

Each pre-termination module box 1 can weld a 24-core optical fiber, so that six module boxes can realize a 144-core wiring. A conventional fusion-type optical fiber box needs to perform screen printing numbers, so that the 1U optical fiber distribution box can realize a 48-core optical fiber wiring at most, and it needs to be fully equipped at the beginning, which improves an investment at an earlier stage and can't be expanded at a later stage. By using the MPO-MDC pre-termination module box of the present disclosure, only one module box can be installed at the earlier stage to realize the 24-core optical fiber splicing wiring, and it is only to increase the number of module boxes for a subsequent expansion without affecting a usage of existing optical fiber wires.

Preferably, each group of the MDC adapters adopts two two-core MDC connectors, and the two two-core MDC connectors are stacked up and down to avoid expanding a width of the module box. In an embodiment of the present disclosure, there are four groups of MPO adapters, therefore, a 48-core pre-termination module box is formed, which can not only be compatible with layouts of 8-core, 12-core and 24-core optical fibers, but also double a capacity thereof.

Figure 7:
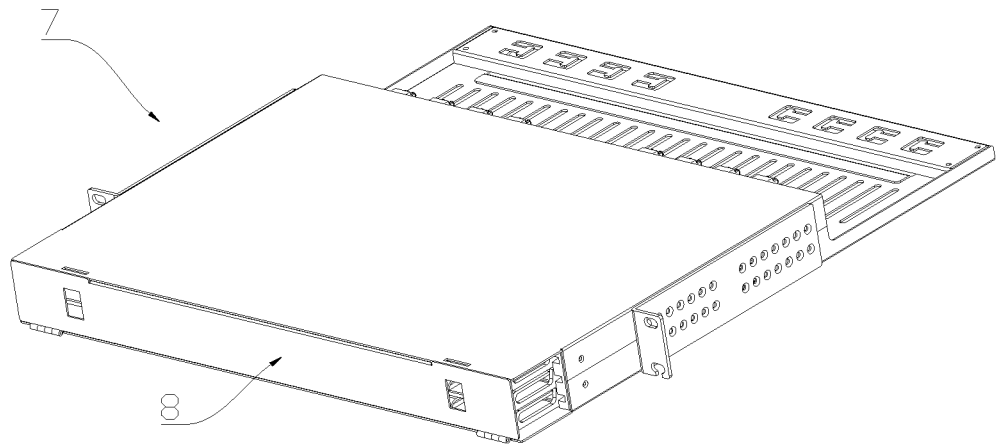
FIG. 7 is a schematic view of an optical fiber distribution box in accordance with an embodiment of the present disclosure.
Figure 8:
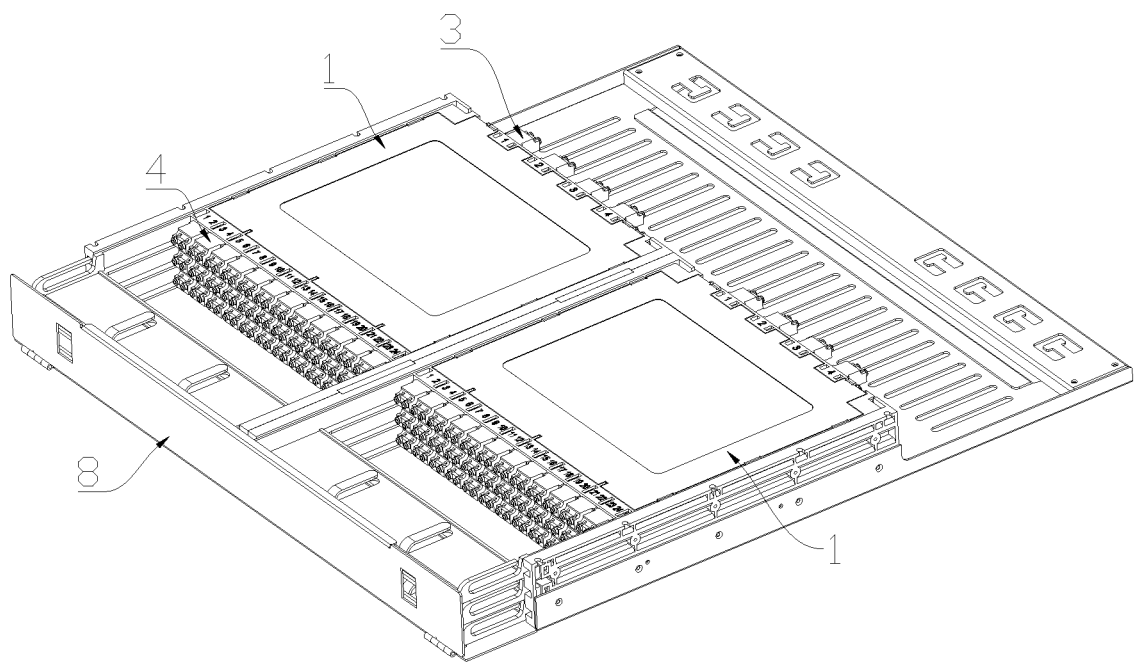
FIG. 8 is an interior schematic view of the optical fiber distribution box of FIG. 7.
Figure 9:
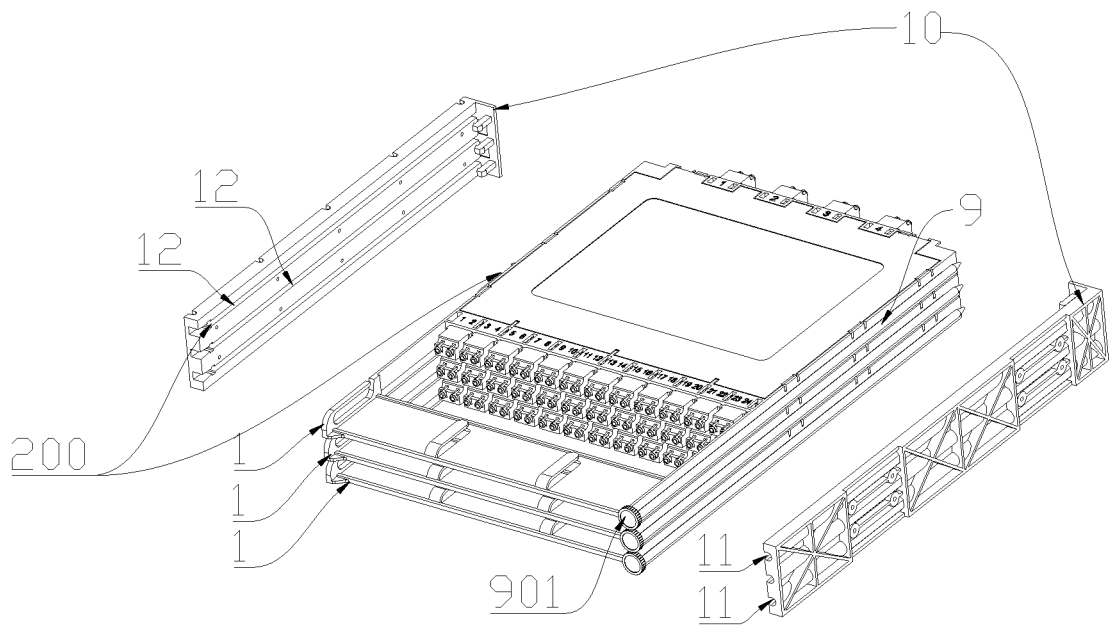
FIG. 9 is a partial assembly view of the optical fiber distribution box of FIG. 7.
Figure 10:
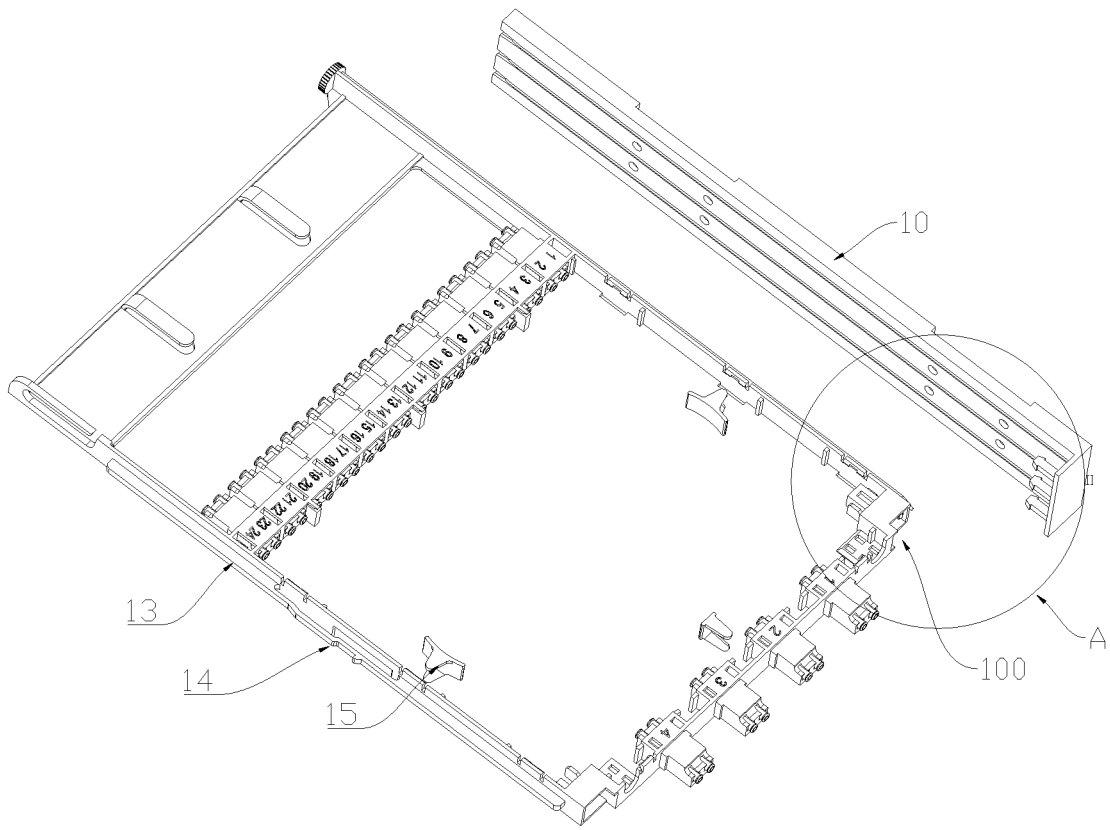
FIG. 10 is a partial schematic view of the optical fiber distribution box of FIG. 7.
Figure 11:
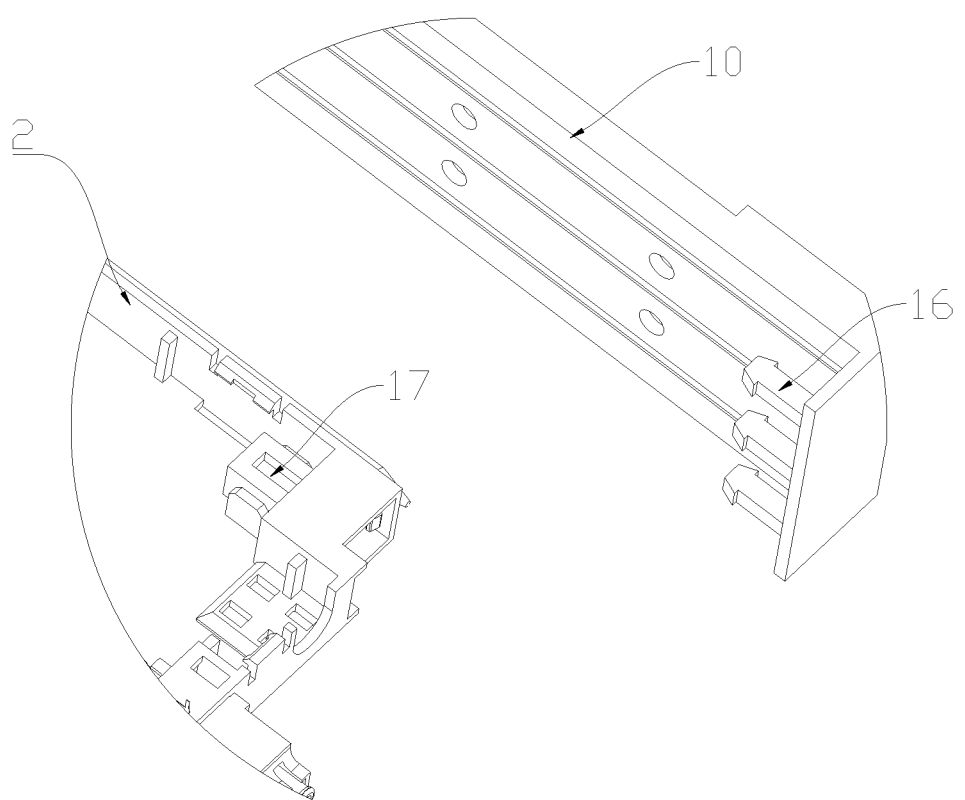
FIG. 11 is an enlarged schematic view of circle A of FIG. 10.
Figure 12:
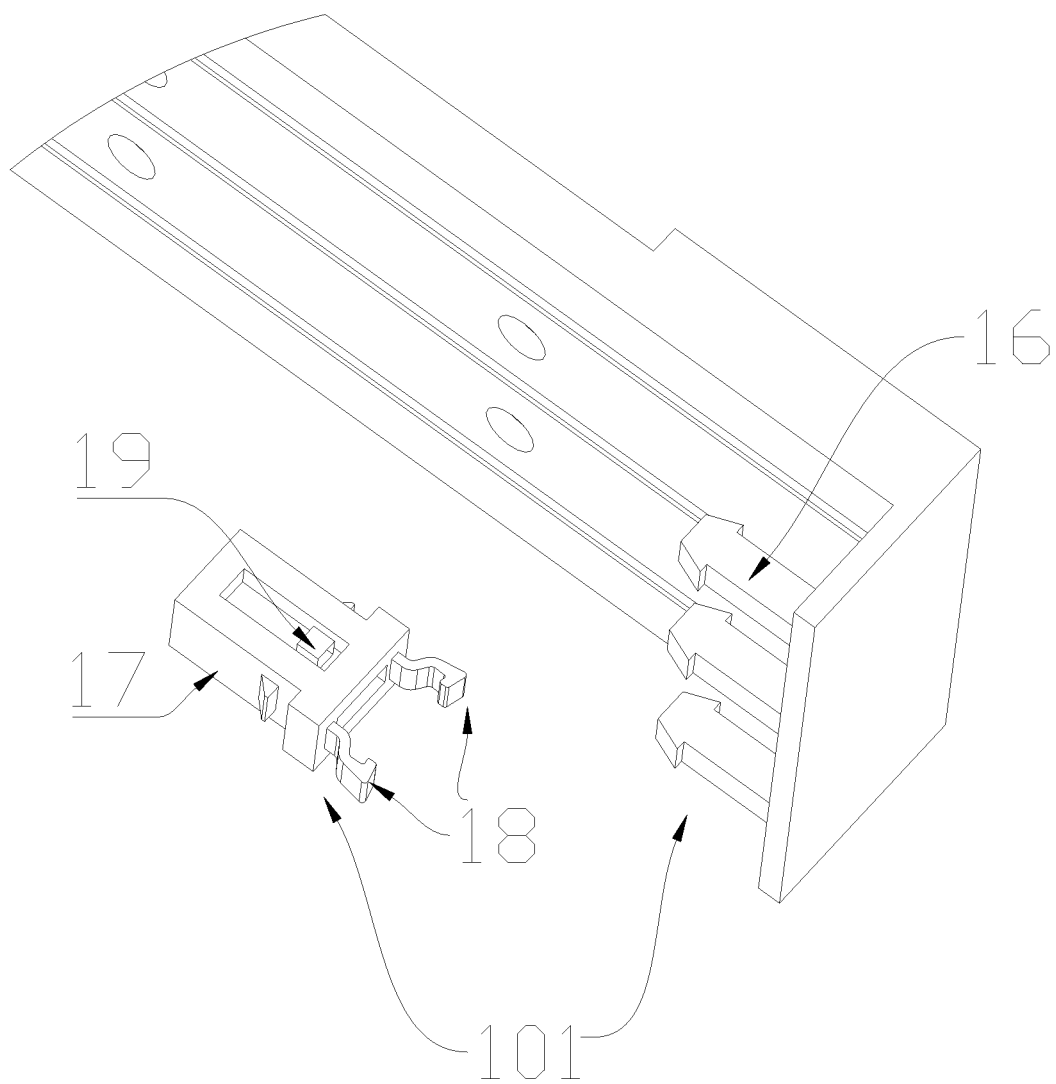
FIG. 12 is a schematic view of an elastic press-type lock of the optical fiber distribution box of FIG. 7.

Referring to FIGS. 7-12, the optical fiber distribution box 7 of the present disclosure includes a box that any one of the above pre-termination module boxes are installed therein, the box including a receiving groove with an opening at an end thereof so that the pre-termination module box can be disassembled and assembled independently through the receiving groove with the opening thereof. The optical fiber distribution box equipped with the aforementioned pre-termination module box can be compatible with 8-core, 12-core and 24-core MPO optical fiber systems. At the same time, the pre-termination module box can be independently disassembled and installed, and can be drawn out separately during maintenance, rather than causing interference to other module boxes in the box.

In some embodiments, the locking member 100 arranged at the rear end of the box body 2 is matched with a rear end of the receiving groove 10 through an elastic press-type lock 101, the box body 2 sliding relative to the receiving groove 10, and when the box body 2 slides into the receiving groove 10 through the opening of the receiving groove 10, the elastic press-type lock 101 is triggered to lock the box body 2 to the box.

The pre-termination module box 1 and the box 8 are matched by the elastic press-type lock 101. During installation, the box body 2 slides into the receiving groove 10, with a contact between the locking member 100 at the rear end of the box body 2 and the receiving groove 10 to lock the box body 2 and the box 8. During unlocking, a pressing force is applied to the box body 2 to unlock the box body 2 and the box 8, and then the box body 2 and the box 8 are taken out.

The elastic press-type lock 101 can save spaces compared with the plastic fixing buckle used in other module boxes, which has a plurality of conventional settings. Such type of lock generally includes a locking tab 16 and a buckling seat 17. The locking tab 16 is operated to enter the buckling seat 17 to lock the locking tab 16 and the buckling seat 17. When unlocking, pressing the locking tab 16 or the buckling seat 17 to move the locking tab 16 relative to the buckling seat 17, so that the locking tab 16 and the buckling seat 17 are unlocked. In the present disclosure, the conventional scheme or the following design can be adopted: the locking tab 16 is arranged on the receiving groove 10, the buckling seat 17 fixed on the box body 2 and including a sliding block 19 with a certain stroke, and a buckling claw 18 interlocked with the sliding block 19. The buckling claw 18 is exposed outside the buckling seat 17 and can be opened and closed. The sliding block 19 includes a spring thereof. When the pre-termination module box 1 enters the receiving groove 10, the buckling seat 17 contacts with the locking tab 16, so that when the locking tab 16 enters the buckling seat 17, the sliding block 19 is pushed to move toward the buckling seat 17, and the locking claw 18 closes the locking tab 16 under an action of both sides of the buckling seat 17, at this time, the sliding block 19 and the buckling seat 17 have positioning and fitting structures therebetween. When unlocking, a pressing plate 901 of a first guiding rod 9 is applied to the box body 2, the box body 2 moves toward the receiving groove 10, and the buckling seat 17 moves toward the locking tab 16, so that the positioning and fitting structures are unlocked. After the force is cancelled, the sliding block 19 is returned along a reverse direction under the action of the spring, and the box body 2 is ejected for a stroke to be unlocked, and then the module box is taken out.

In order to make the box body 2 of the pre-termination module box 1 stably enter and exit the receiving groove 10, the first guiding rod 9 and a second guiding rod 13 are respectively arranged at two sides of the box body 2, the first guiding rod 9 is cylindrical, and the second guiding rod 13 is square; a first guiding groove 11 and a second guiding groove 12 respectively arranged at two sides of the receiving groove 10 to in conformity with the corresponding first and second guiding rods 9, 13, the first guiding groove 11 is cylindrical, and the second guiding groove 12 is square; a front end of the first guiding rod 9 extending outside, and the pressing plate 901 arranged at the front end of the first guiding rod 9 for releasing the box body 2. When the box body 2 slides in or out of the receiving groove 10, the front end of the first guiding rod 9 moves along the first guiding groove 11, and the second guiding rod 13 moves along the second guiding groove 12, so that a difference between the sliding fitting structures makes the box body 2 more stable.

In some embodiments, a limiting structure 200 is arranged between the box body 2 of the pre-termination module box 1 and the receiving groove 10, and operable to be released. When the box body 2 is taken out to a preset position, a block 14 prevents the pre-termination module box 1 from being drawn out continuously, so as to prevent a peripheral MPO patch cord that is connected with the MPO patch cord 5 in the pre-termination module box 1 from being straightened and protect a normal use of an entire optical fiber network. When the pre-termination module box 1 needs to be disassembled, cables connected to the periphery are first drawn out, and then the limiting structure 200 is released so that the pre-termination module box 1 is completely drawn out. The limiting structure 200 can be an elastic protrusion. When the box body 2 is drawn out to the preset position, the elastic protrusion is embedded in a corresponding stroke groove, and then pressed to disengage from the stroke groove, thereby releasing the stroke limitation, and the box body 2 can be completely drawn out.

By setting the two-core MDC connector and a rear locking device and other structural layouts, the pre-termination module box can maintain a small size while strengthening a compatibility thereof, so that six pre-termination module boxes 1 can be placed in the 1U optical fiber distribution box 7 to realize the 1U 144-core MDC optical fiber wiring. Furthermore, the two two-core MDC connectors are stacked up and down in each MDC adapter to form the 48-core pre-termination module box and the 1U 288-core optical fiber distribution box, so that the capacity is doubled.

The 1U 288-core optical fiber distribution box can adopt the following implementation scheme: the optical fiber distribution box 7 has two receiving grooves 10 arranged side-by-side, so that each receiving groove 10 receives three pre-termination module boxes stacked up and down. Specifically, each receiving groove 10 is provided with three groups of guiding grooves at a side wall thereof for placing the three pre-termination module boxes 1 therein, in this way, each pre-termination module box 1 can be disassembled independently without being interference with other pre-termination module boxes. It can be expanded to a 2U 576-core fiber wiring and a 4U 1152-core fiber wiring according to requirements to improve a space utilization of a data center.

To sum up, the adapters in the improved pre-termination module box 1 and the optical fiber distribution box 7 do not need to be customized, and have a high wiring capacity, which is conducive to reducing a floor area of the central machine room and saving costs. It can not only realize the same functions of the MPO optical fiber distribution box 7 in the market, but also can install the MDC optical fiber connectors, so that the optical fiber capacity can be doubled. Each pre-termination module box 1 in the optical fiber distribution box can be disassembled and maintained independently without interference with other pre-termination module boxes, which can effectively protect a normal signal transmission of other module boxes.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An optical fiber distribution box comprising:
   a box comprising a receiving groove with an opening at an end thereof;
   a pre-termination module box comprising:
   a box body;
   twelve groups of MDC adapters configured at a front end of the box body and arranged in a horizontal single row, each group of the twelve groups of MDC adapters adopting at least one two-core MDC connector, and a plurality of groups of MPO adapters configured at a rear end of the box body and arranged in a horizontal single row to connect with the twelve groups of MDC adapters; and
   a receiving room formed in the box body for receiving patch cords that are connected between the twelve groups of MDC adapters and the plurality of groups of MPO adapters, a locking member arranged at the rear end of the box body and configured to lock pre-termination module box in an optical fiber distribution box; and wherein
   the pre-termination module box can be disassembled independently through the receiving groove with the opening thereof; and wherein
   the locking member arranged at the rear end of the box body is matched with a rear end of the receiving groove through an elastic press-type lock, the box body sliding relative to the receiving groove, and when the box body slides into the receiving groove through the opening of the receiving groove, the elastic press-type lock is triggered to lock the box body to the box; and wherein
   a first guiding rod and a second guiding rod are respectively arranged at two sides of the box body, the first guiding rod is cylindrical, and the second guiding rod is square, a first guiding groove and a second guiding groove respectively arranged at two sides of the receiving groove to in conformity with the corresponding first and second guiding rods; a front end of the first guiding rod extending outside, and a pressing plate arranged at the front end of the first guiding rod for releasing the box body.

2. The optical fiber distribution box as claimed in claim 1, wherein a limiting structure is arranged between the box body of the pre-termination module box and the receiving groove, and operable to be released.

3. The optical fiber distribution box as claimed in claim 2, wherein there are two receiving grooves arranged in the box side by side, and three pre-termination module boxes stacked up and down in each of the two receiving grooves.

* * * * *